(12) United States Patent
Bieker et al.

(10) Patent No.: US 7,625,030 B2
(45) Date of Patent: Dec. 1, 2009

(54) REDUCTION OF TORSIONAL VIBRATION IN RAIL VEHICLE WHEEL SETS

(75) Inventors: Guido Bieker, Kirchhundem (DE); Heinz Dieter Dörner, Nistertal (DE)

(73) Assignee: Bombardier Transportation, Berlin (DE)

( * ) Notice: Subject to any disclaimer, the term of this patent is extended or adjusted under 35 U.S.C. 154(b) by 758 days.

(21) Appl. No.: 10/521,361

(22) PCT Filed: Jul. 16, 2003

(86) PCT No.: PCT/IB03/03816

§ 371 (c)(1),
(2), (4) Date: Jan. 14, 2005

(87) PCT Pub. No.: WO2004/007217

PCT Pub. Date: Jan. 22, 2004

(65) Prior Publication Data

US 2006/0021542 A1    Feb. 2, 2006

(30) Foreign Application Priority Data

Jul. 17, 2002    (GB) ................... 0216624.7

(51) Int. Cl.
*B60B 17/00*    (2006.01)
(52) U.S. Cl. ............... 295/7; 301/6.91; 188/33
(58) Field of Classification Search .......... 295/7, 295/11, 23; 301/6.1, 6.7, 6.8, 6.91; 188/33, 188/205 A
See application file for complete search history.

(56) References Cited

U.S. PATENT DOCUMENTS

| | | | | |
|---|---|---|---|---|
| 1,765,477 A | * | 6/1930 | Ackerman | 295/7 |
| 2,646,308 A | * | 7/1953 | Boschi | 295/11 |
| 3,530,960 A | * | 9/1970 | Otto et al. | 188/218 XL |
| 3,993,356 A | * | 11/1976 | Groff et al. | 301/6.91 |
| 4,018,311 A | * | 4/1977 | Tickle | 188/218 XL |
| 4,353,586 A | | 10/1982 | Raquet | |
| 4,392,681 A | | 7/1983 | Raquet | |
| 4,496,183 A | | 1/1985 | Kasper | |
| 4,635,990 A | * | 1/1987 | Golubenko et al. | 295/11 |
| 4,679,665 A | * | 7/1987 | Smith | 188/218 XL |
| 5,010,985 A | * | 4/1991 | Russell et al. | 188/218 XL |
| 6,565,158 B2 | * | 5/2003 | Seimiya | 301/6.91 |

FOREIGN PATENT DOCUMENTS

DE    2616393 A    11/1977

(Continued)

Primary Examiner—Russell D. Stormer
(74) Attorney, Agent, or Firm—David P. Owen; Howrey LLP

(57) ABSTRACT

In order to reduce torsional vibrations and wheel slip in a wheel set for a rail vehicle the wheel set comprising a pair of wheels connected by an axle is provided with a vibration absorbing device comprising a mass, resiliently mounted on the wheel set and adapted to oscillate at the resonant frequency of torsional vibrations of the wheel/axle system. A method of preventing or reducing torsional vibrations in a wheel set of a rail vehicle is also disclosed, the method comprising determining the resonant frequency of torsional vibrations of the wheel/axle system and resiliently mounting a vibration absorbing device in the form of a mass, on the wheel set, the mass and its resilient mounting being selected to oscillate at or near that resonant frequency.

23 Claims, 10 Drawing Sheets

FOREIGN PATENT DOCUMENTS

| | | |
|---|---|---|
| DE | 19501613 A | 7/1996 |
| DE | 19620902 A | 12/1997 |
| DE | 19856881 A | 6/2000 |
| EP | 0816126 A1 | 1/1998 |
| GB | 2021501 A | 12/1979 |
| GB | 2027844 A | 2/1980 |
| WO | WO 97/33100 A | 9/1997 |

* cited by examiner

REDUCTION OF TORSIONAL VIBRATION IN RAIL VEHICLE WHEEL SETS

The invention relates to methods and devices for the reduction or prevention of torsional vibrations and in particular to the reduction or prevention of such vibrations in the wheel sets of rail vehicles. It further relates to rail systems incorporating such devices and adapted to provide anti-slip control beyond the limits of currently available systems.

It is well known that during braking, undesirable forces may be produced in the axles of rail vehicles such as trains and trams. Other situations, such as when driving on wet or greasy rails or in the case of increased load due to e.g. breakdown of one drive unit, may also lead to torsional vibration of the axle. Typically, this vibration occurs when one wheel of a wheel set moves in anti-phase with the other wheel, with the axle connecting them functioning as a torsional spring oscillating in its fundamental mode. Increasing the stiffness of the axle can reduce this effect but can also lead to further undesirable load on the transmission, due to abrupt changes of load being transmitted through the drive train. These effects are particularly acute in modern rail systems which are designed to work at the limits of adhesion between the wheel and the rail.

For this type of vibration, the node is usually located at the centre point of the axle. Where the drive is also located at the centre of the axle, it experiences no effect from the vibration but can also not be used to influence it. Locating the drive off-centre can provide a certain degree of control over these vibrations and can cause a reduction therein. Under such circumstances it is possible to detect the vibration and to counteract it by appropriate motor control in a manner similar to that used in anti-lock braking systems. The constructional arrangement of the drive on the bogie or vehicle frame does not however always allow for off-centred positioning of the drive with respect to the axle. In diesel units, such high speed control is not presently possible and other means must be sought to counteract these torsional vibrations.

As a consequence of such unwanted torsional vibrations, considerable performance may be lost. In particular, desired acceleration may not be achievable, especially where the condition of the track is not optimal as may be the case when snow, leaves or grease are present on the line. This effect is especially critical in those situations where a drive unit is under additional load. Many twin-drive units are designed such that, in the case of failure of one unit, the train may complete its journey under the power of the remaining unit. Under such conditions, it has been found that a loss of adhesion caused by these torsional vibrations may occur when negotiating an incline. If this happens, the train may stall and be unable to complete its journey, requiring tow-away. Similarly, during braking, maximum braking capacity may not be achieved with the consequence that lower speeds must be maintained. The axle itself is also subjected to undesirable internal stresses caused by the torsional vibrations.

The problem is particularly severe in the case of constructions using wheel-mounted disk brakes since in these cases the wheel set inertia is particularly unfavourable. Recent measurements indicate that torsional vibrations also occur in vehicles with axle-mounted disk brakes and central drive units as are often used in diesel driven vehicles. Typically these vibrations have frequency values lying in the region of 50 Hz-120 Hz.

One solution to the problem of torsional vibrations in rail vehicle wheel sets is proposed by patent application DE198566881 A which discloses an asymmetrically built axle. By providing one half of the axle to have a greater moment of inertia than the other half, the vibrational node is shifted away from the mid-point and the centrally mounted drive can be used to counteract any oscillation. Such a solution cannot however be used in conjunction with current diesel drives and is also not applicable to non-driven axles.

Vibration absorbing devices have also been used in the context of rail vehicle wheel sets for other purposes. Document DE19501613 A discloses the use of a vibration reducing element attached to the flange of a rail vehicle wheel. The device is adapted to oscillate at high frequencies in the audible range in order to damp vibrations and reduce noise. Due to its relatively light construction it is unsuitable for the reduction of torsional vibrations of the complete wheel set, which requires a much greater mass in proportion to that of the wheel set itself.

There is therefore a need for an improved system for reducing vibrations in the axles of rail vehicles.

According to the present invention a wheel set for a rail vehicle is provided comprising a pair of wheels connected by an axle, and further comprising a vibration absorbing device comprising a mass resiliently mounted on the wheel set and adapted to oscillate at the resonant frequency of torsional vibrations of the wheel/axle system.

Further advantageous embodiments of a wheel set with reduced tendency to undergo torsional vibrations are disclosed according to the features of the dependent claims.

The present invention also foresees a method of preventing or reducing torsional vibrations in a wheel set of a rail vehicle comprising a pair of wheels connected by an axle, the method comprising determining the resonant frequency of torsional vibrations of the wheel/axle system and resiliently mounting a vibration absorbing device comprising a mass on the wheel set, the mass and its resilient mounting being selected to oscillate at or near that resonant frequency.

In order to maximise the effect of the vibration absorbing means, they should preferably be mounted at locations where the amplitude of vibrational motion is greatest, namely as far from the vibrational node as possible. It has been found that locating the vibration absorbing device at a radially outward location on the wheel is particularly advantageous in reducing this unwanted vibration of the wheel set at its fundamental frequency.

Of particular importance, is the presence of appropriate damping between the vibration absorbing device and the wheel set. Without damping, the vibration absorbing device will operate effectively over a particular, narrow frequency range. As the mass and inertia of the wheel set changes as a result of wearing down of the wheels there will come a point where the natural frequency of the torsional vibration lies outside this narrow band and the device will be unable to absorb effectively. By including damping in the system, the effective bandwidth of the vibration absorbing device is increased, allowing it to function effectively over a wider range of frequencies covering those values corresponding to all conditions of the wheel set e.g. the extremes of wear of the wheels. Excessive damping however, should be avoided as it has the effect of reducing the overall amplitude of vibration absorbed.

One particularly advantageous embodiment of the present invention utilises the mass of the brake disks as the vibration absorbing means. This reduces the need to add further mass to the wheel set, taking advantage of both the existing high moment of inertia of the brake disks and their distance from the node of vibration at the mid point of the axle. The vibration absorbing device may comprise two brake disks located on either side of the wheel and connected by spring elements passing through the wheel. Alternatively, both brake disks may be connected by other connecting means e.g. screws directly to the wheel. Both brake disks may be provided with a surface in contact with the wheel, which is prepared to have a particular coefficient of friction to ensure adequate damping.

According to this aspect of the present invention the brake disks are used as a counter-oscillating mass. In this way no further massive constructional elements are required. Special spring steel elements e.g. in the form of springs sleeves, provide the necessary elastic connection of the brake disk to the wheel. Even during active braking the counter vibration of the brake disk is still possible so that even with engaged brake shoes the function of the brake disk as a vibration absorbing device is maintained. The spring steel elements have a torsional stiffness that is so chosen, that together with the mass of the brake disk a harmonic frequency at the torsional frequency of the wheel set is achieved. In this way the torsional vibration of a wheel set is prevented by anti-phase vibration of the brake disks.

According to an alternative embodiment of the invention the vibration absorbing device may comprise a metal ring or ring segments provided with a vulcanised rubber layer for attachment to the wheel. Preferably the ring is arranged at a radially outer extent of the wheel and may be attached by clamps, screws, bolts, adhesive or other means. The rotational mass of the damping device is matched to the stiffness of the rubber in order to match the natural frequency of the axle. At this natural frequency the damping device will be excited in anti-phase with the wheel vibrations, thereby preventing the occurrence of resonant effects.

The vibration absorbing device of the present invention thus provides a simple and effective means for reducing torsional vibrations in rail vehicle wheel sets. It is simple in construction and requires no energy supply and little maintenance. It may be fitted to existing wheels and is suitable for use on both driven and non-driven wheel sets. Its independence from the drive system also allows the drive control system to be better adapted to anti-slip control since the operating parameters of such a control system need not then take into account the stabilisation of torsional vibration.

Embodiments of the present invention will now be described by way of example only having reference to the accompanying figures, in which.

Figure 2:
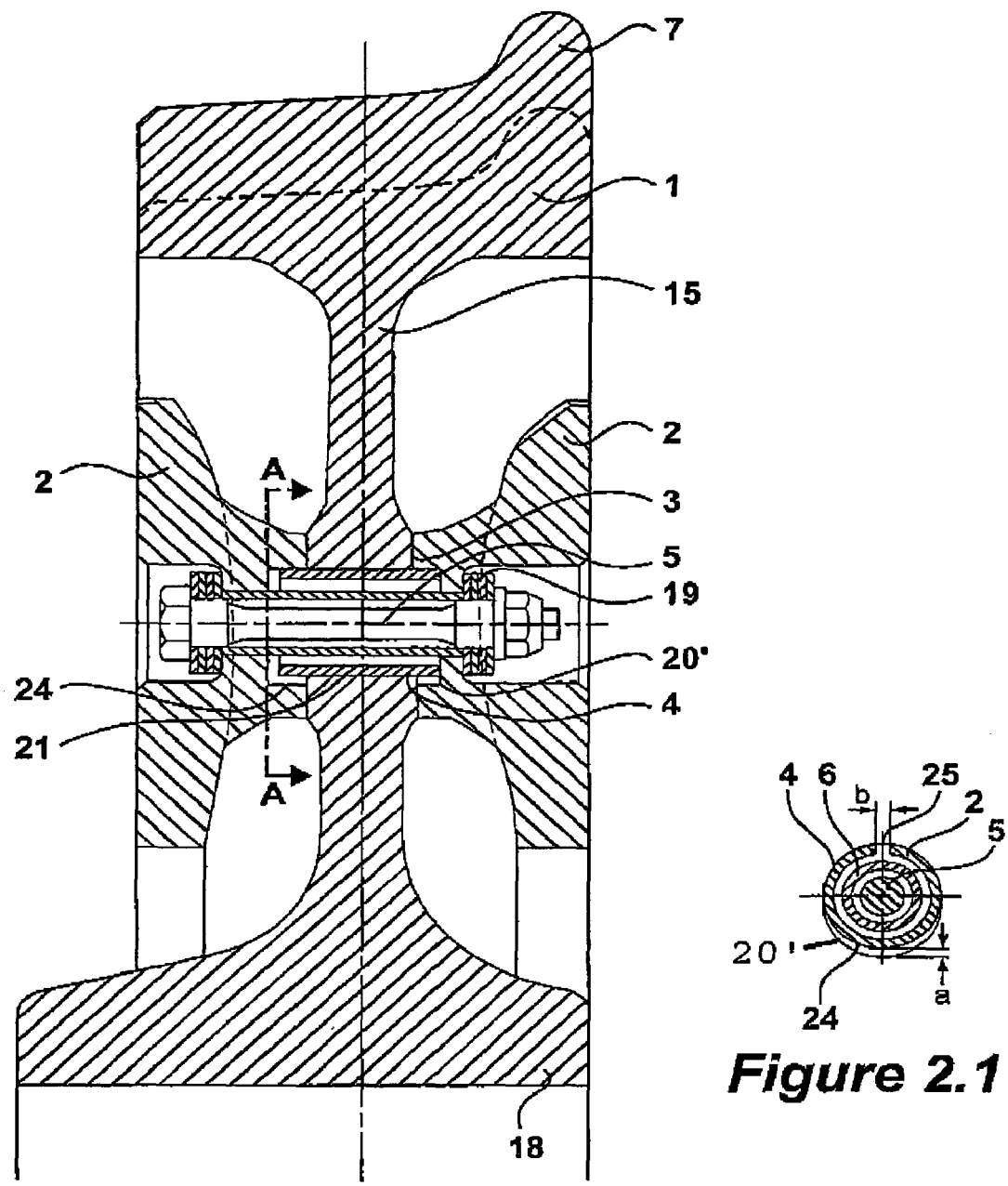
FIG. 2 is a cross-sectional view of an alternative arrangement for the resilient mounting of the brake disks including a compression sleeve.
Figure 3:
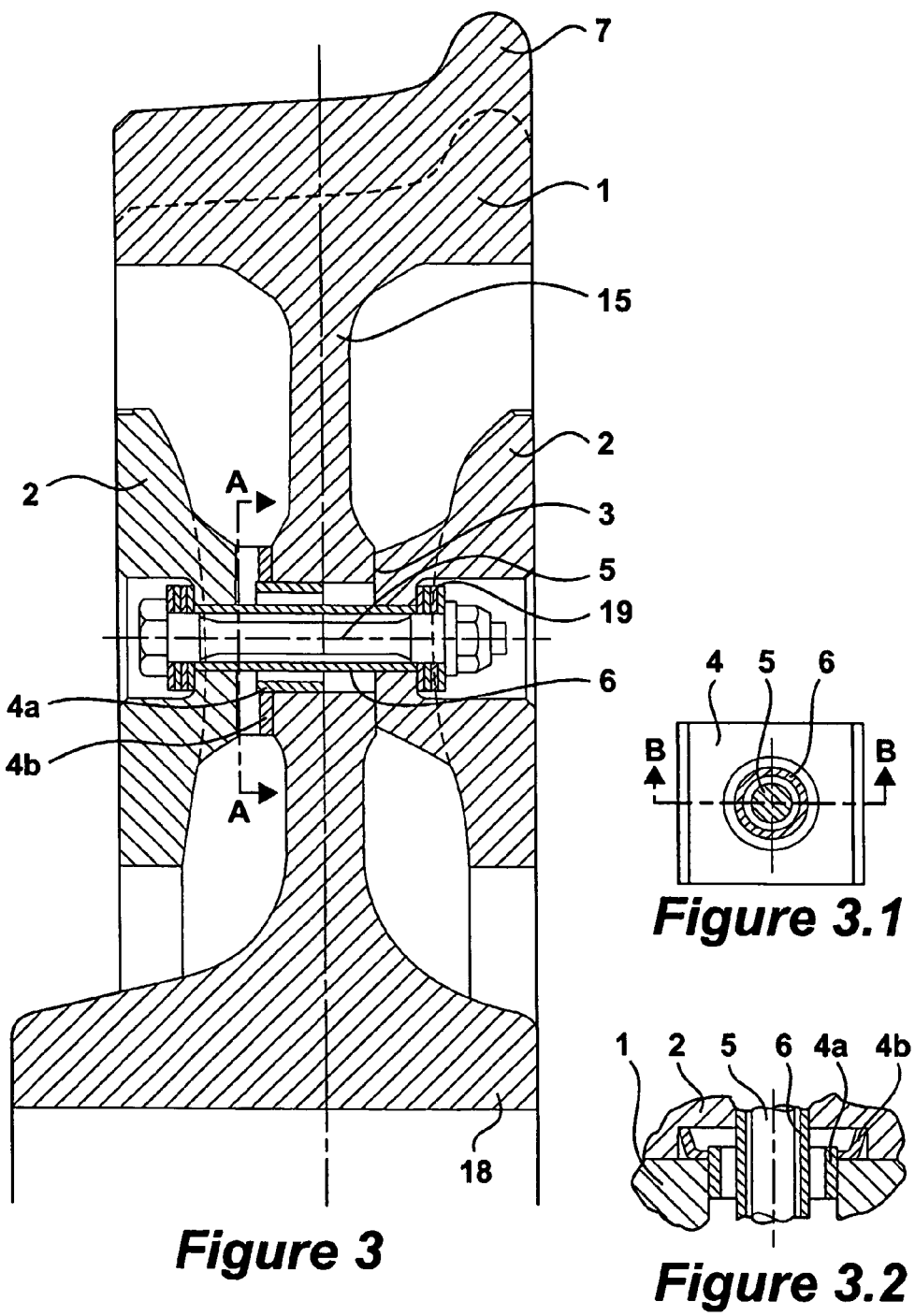
Figure 4:
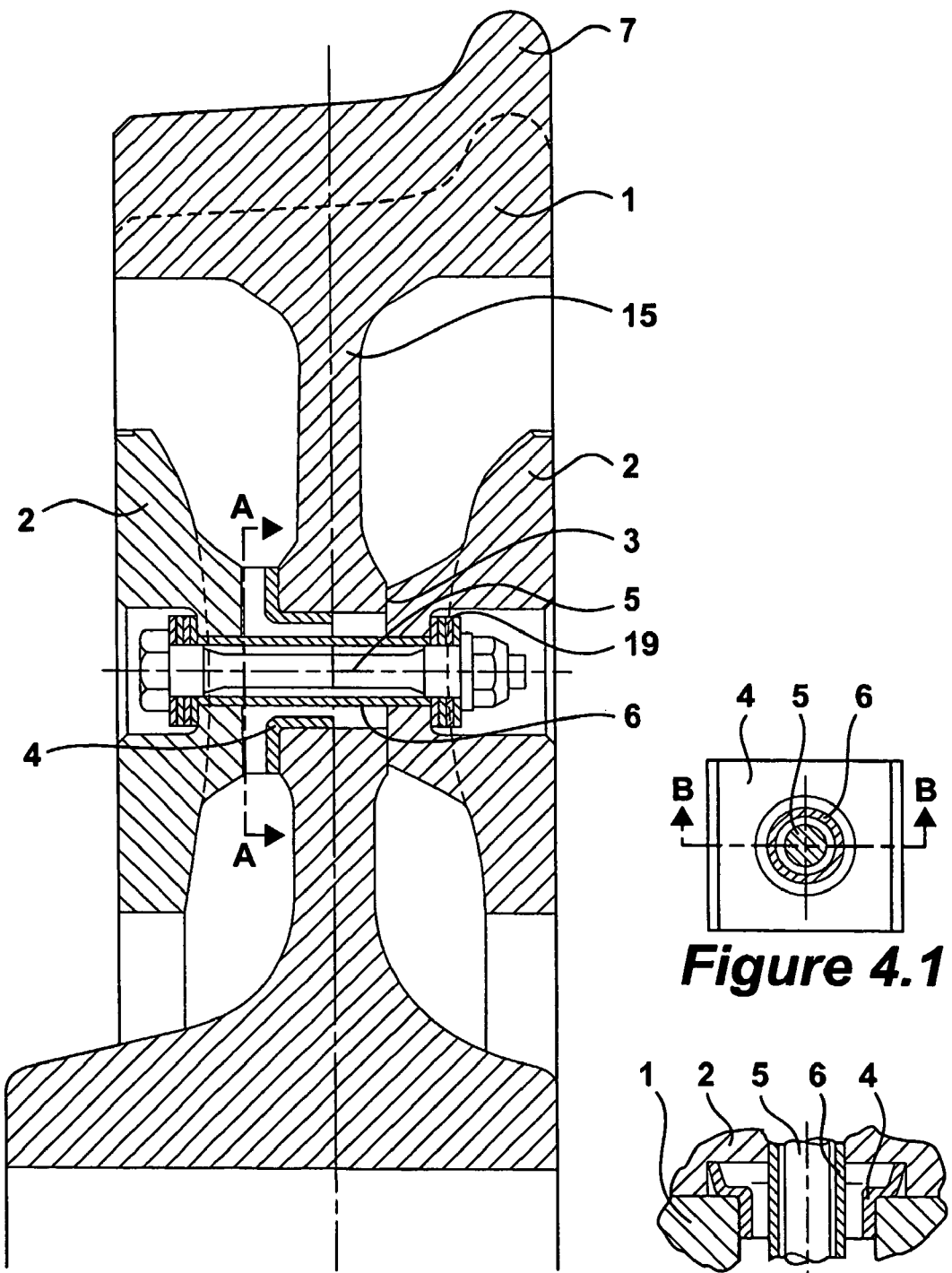
Figure 6:
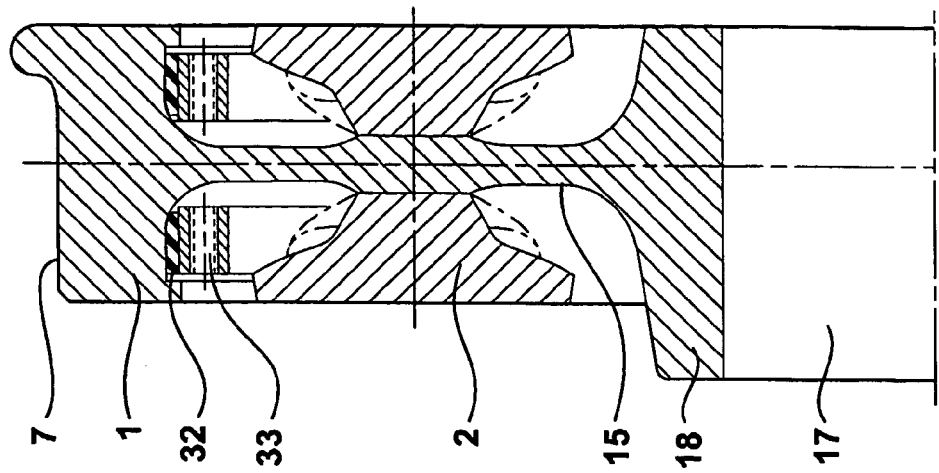
Figure 5:
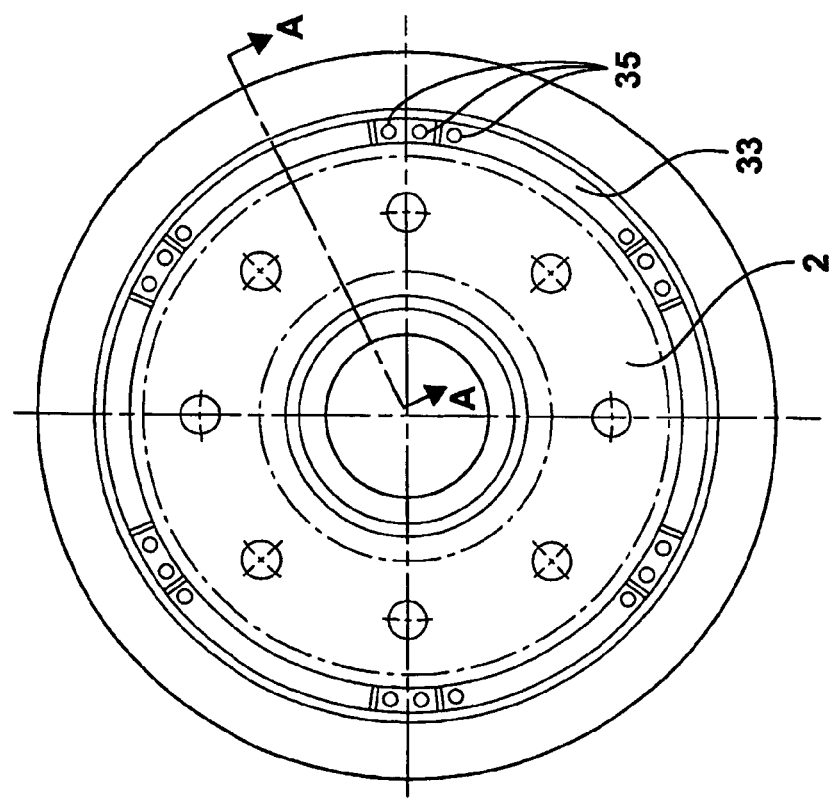
Figure 7:
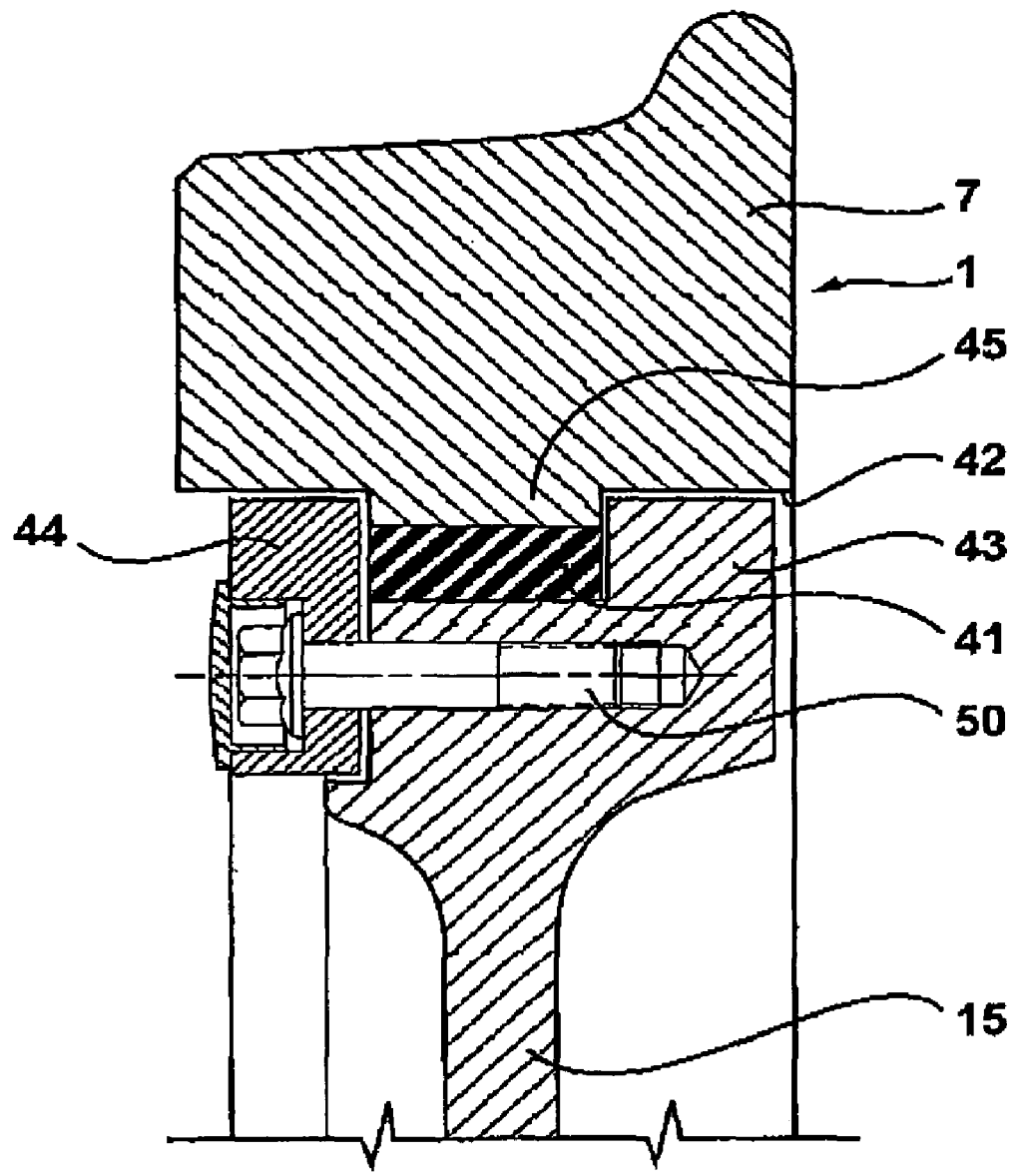
Figure 8:
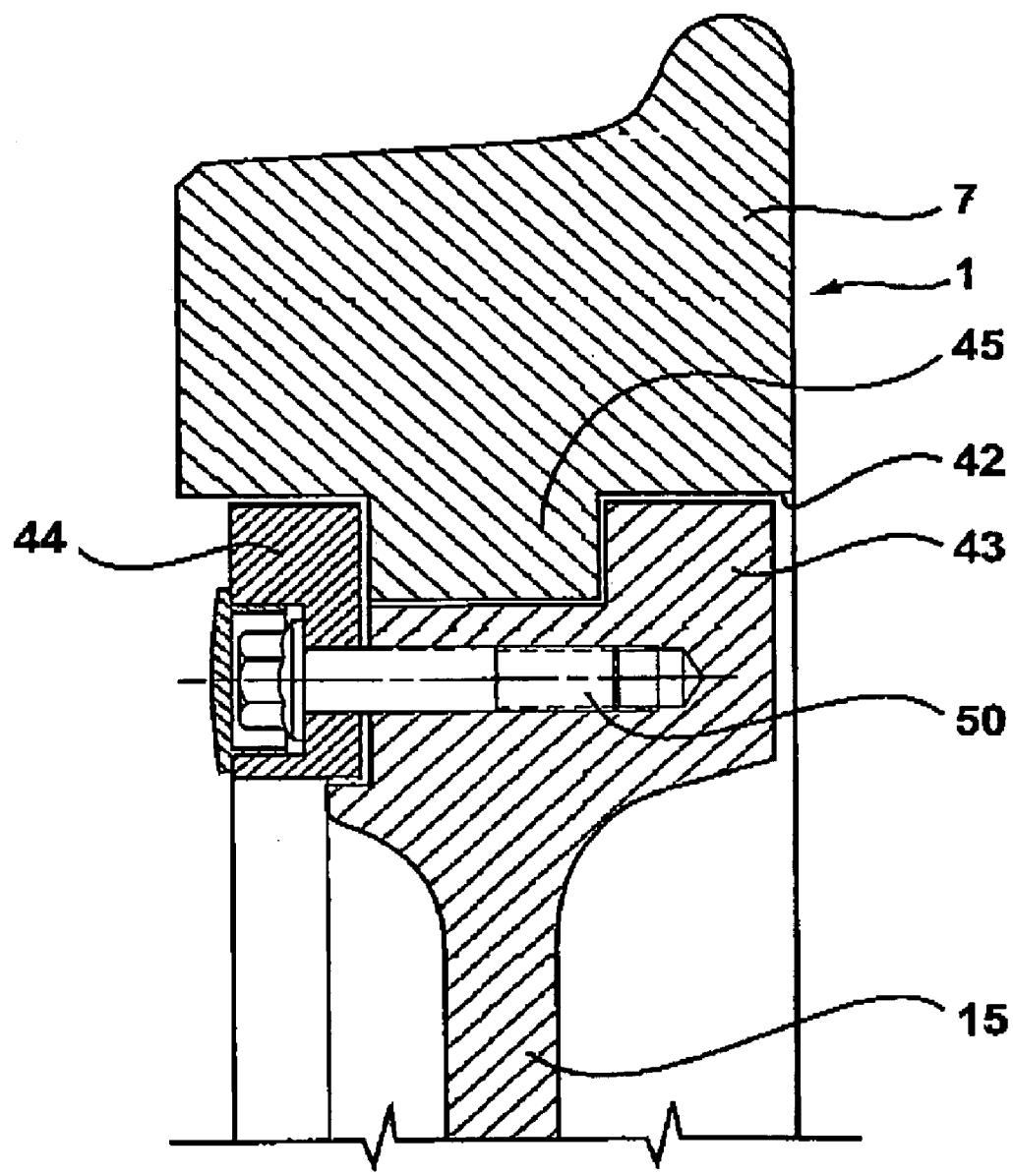
Figure 9:
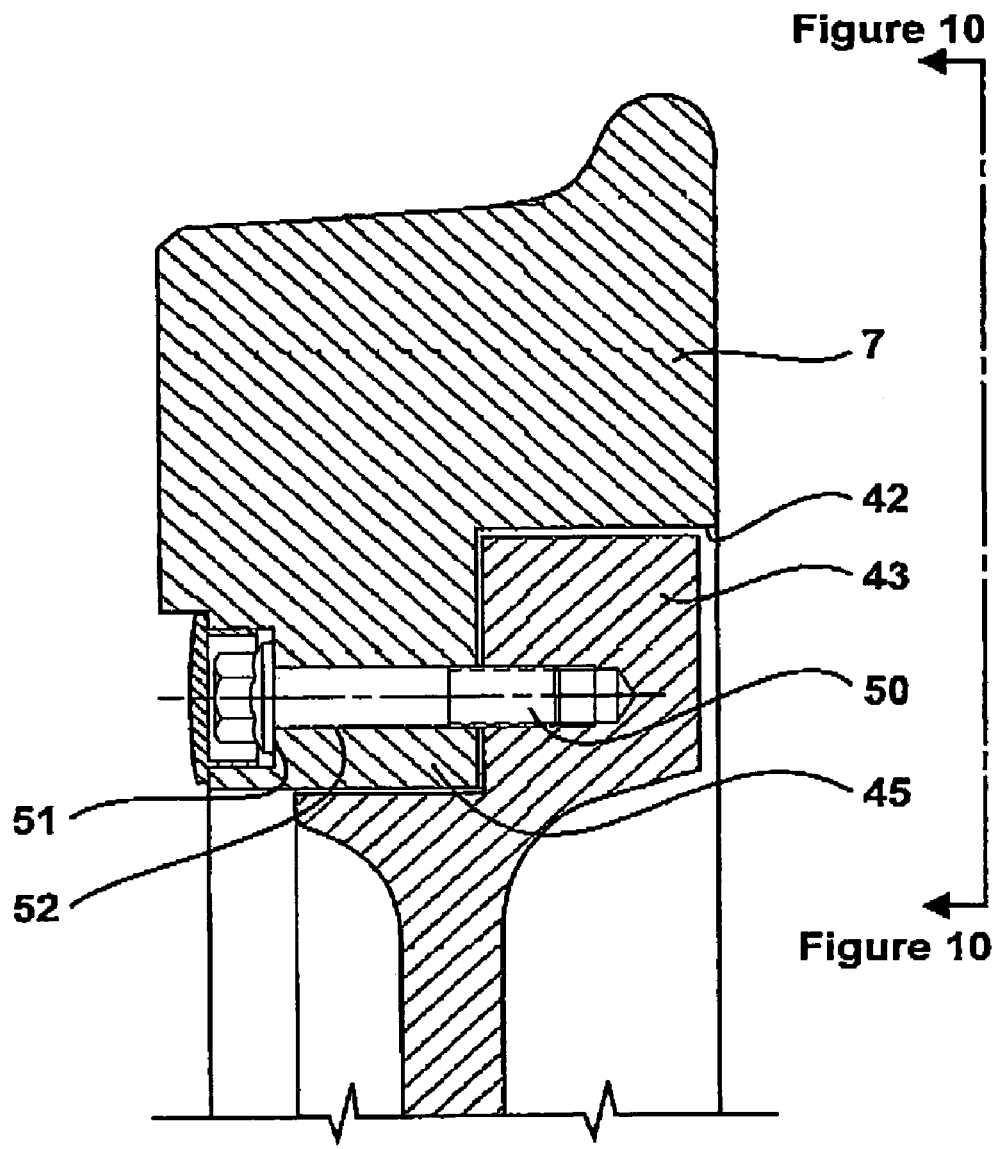
Figure 10:
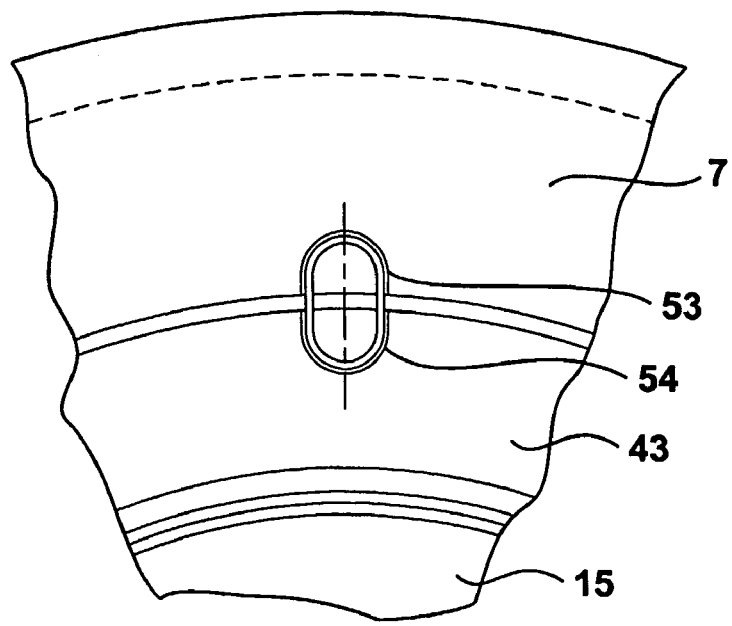
Figure 11:
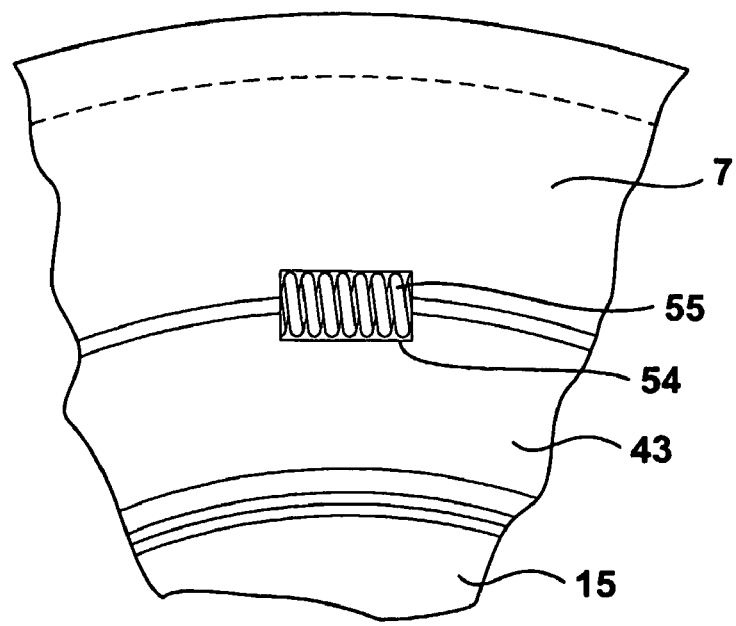
Figure 12:
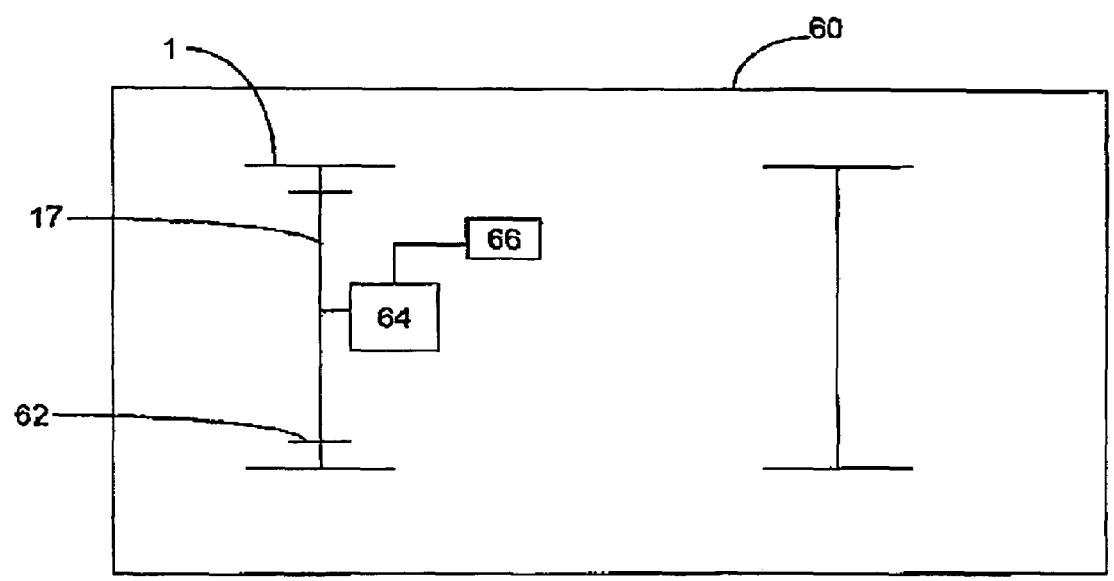

FIG. 2.1 is a cross-sectional view along line A-A of FIG. 2;

FIG. 3 is a cross-sectional view of another alternative arrangement for the resilient mounting of the brake disks using a centering sleeve and spring plate;

FIG. 3.1 is a cross-sectional view along line A-A of FIG. 3;

FIG. 3.2 is a cross-sectional view along line B-B of FIG. 3.1;

FIG. 4 is a cross-sectional view of a similar embodiment to FIG. 3 with a press-formed resilient mounting;

FIG. 4.1 is a cross-sectional view along line A-A of FIG. 4;

FIG. 4.2 is a cross-sectional view along line B-B of FIG. 4.1;

FIG. 5 is a view of another alternative embodiment of a vibration absorbing device in the form of rubber mounted ring segments;

FIG. 6 is a cross-sectional view along line A-A of FIG. 5;

FIG. 7 is a cross-sectional view of a further alternative embodiment of a vibration absorbing device comprising a rubber mounted rim;

FIG. 8 is a cross-sectional view of a further alternative embodiment of a vibration absorbing device comprising a moveably mounted rim;

FIG. 9 is a cross-sectional view of an alternative construction for the device of FIG. 8;

FIG. 10 is a partial view of the device of FIG. 9 along line 10-10 illustrating a spring element;

FIG. 11 is a similar view to FIG. 10 illustrating an alternative spring element; and FIG. 12 is a schematic view of a vehicle incorporating a wheel set according to the invention.

Figure 1:
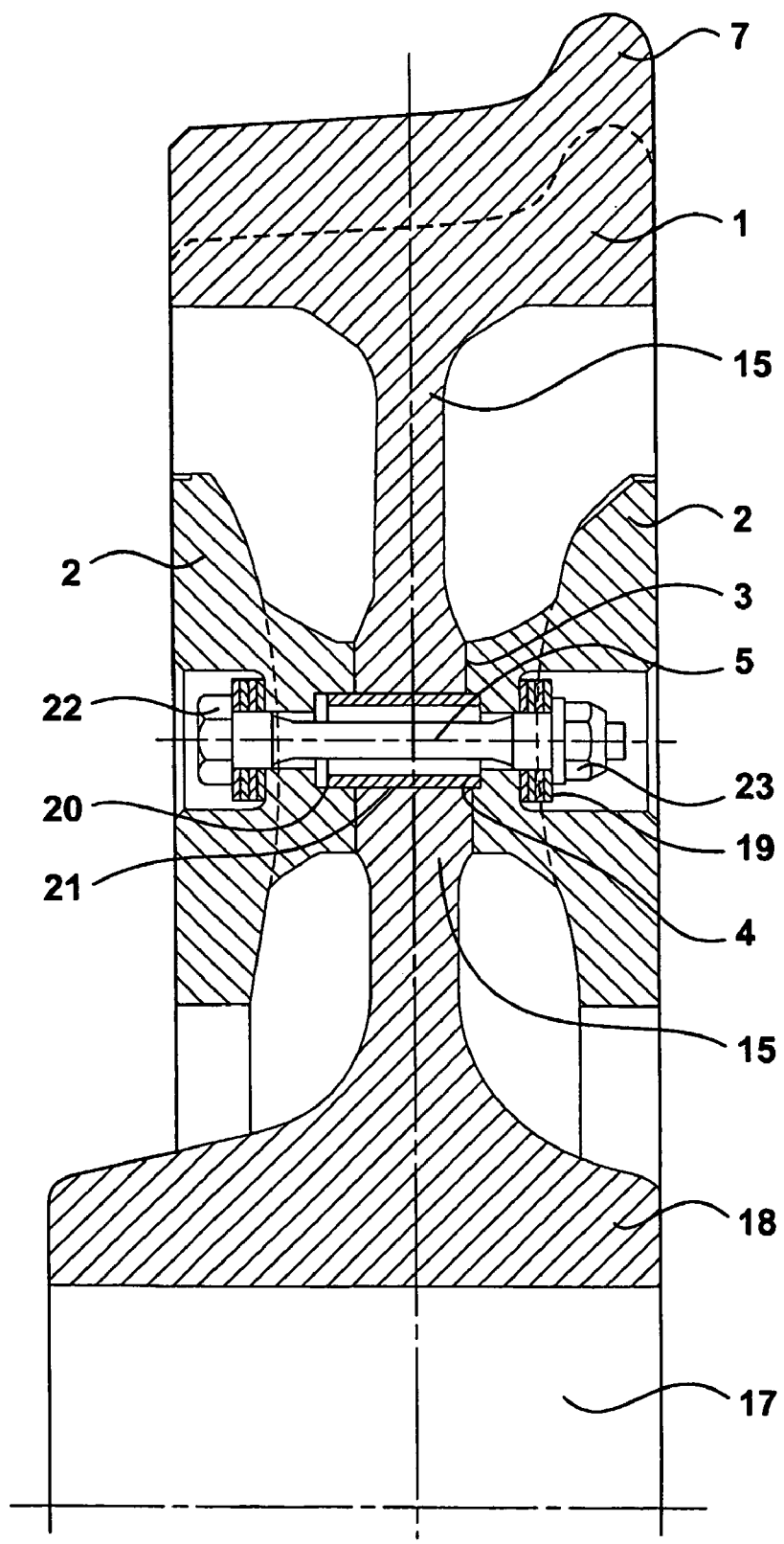
FIG. 1 is a cross-sectional view of a wheel according to the present invention with resiliently mounted brake disks.

FIG. 1 illustrates an arrangement for the reduction or prevention of torsional vibrations in rail vehicle wheel sets. The wheel set comprises a pair of wheels 1 (of which one is illustrated) rigidly mounted to an axle 17. Although the mounting is nominally rigid, in the context of the present invention it should be noted that the axle is subject to torsional forces and can twist such that one wheel may rotate with respect to the other wheel. These oscillations depend on the construction of the wheel set and on the load conditions.

Each wheel comprises a hub section 18 and a generally cylindrical rim 7 spaced apart by a flange 15 extending between the wheel rim 7 and the wheel hub 18. The limit of maximum wear of the rim is shown by a broken line. In the illustrated embodiment the wheel 1 is provided with two annular brake disks 2 arranged concentrically about the axle on either side of the flange 15. In an alternative embodiment of the invention a single brake disk mounted on just one side of the flange 15 could also be considered. In order to ensure that the brake disks 2 can oscillate with respect to the wheel 1, the region of contact between the flange 15 and the facing surface of the brake disk 2 advantageously comprises a prepared surface 3 having a particular coefficient of friction. Usually this friction determining surface should serve to reduce the friction between the two surfaces. The prepared surface 3 may be provided on the flange 15 or on the brake disk 2 or on both and may comprise any suitable means for reducing or enhancing friction or may involve the inclusion of an intermediate friction determining layer between the adjacent surfaces. Typical preparations may include polishing or coating. A coating or intermediate layer of PTFE has been found to be particularly effective.

The region of contact between the flange 15 and the facing surface of the brake disk 2 also serves to provide damping. The amount of damping is determined by the coefficient of friction of the two surfaces and the force with which they are pressed together. In the present case, this force may vary as the brakes are applied causing the disks 2 to be pressed tighter against the flange 15.

The two brake disks 2 are connected together by bolts 5 which extend through bores 21 in the flange 15. The attached figures illustrate crossections taken through a single bolt but it is to be understood that a number of bores 21 and corresponding bolts 5 are present, preferably arranged in a concentric circle around the wheel axle 17. As an example, eight bolts 5 per wheel may be used to ensure adequate securement of the brake disks. In the remaining description, only a single bolt assembly will be described.

The bolt 5 is secured by a suitable nut 23. Suitable spring washers 19 or other means to prevent loosening of the nut 23 are arranged between the nut 23 and the brake disk 2 and between the bolt head 22 and the brake disk 2. The head 22 of the bolt 5 and the nut 23 are countersunk into the brake disk 2. Alternative forms of connecting element may also be used to achieve the same effect. In particular, in the case of only one brake disk, the bolt 5 may be replaced by a threaded stub extending from the flange surface. In such an arrangement, appropriate friction reducing means could be required beneath the nut 23 in addition to the prepared surface 3 in order to ensure free movement of the brake disk.

A spring sleeve 4 surrounds the bolt 5 and extends through the flange 15 and into a counter bore 20 in the brake disks 2. Alternative forms of spring element may also be used instead of spring sleeve 4, such as a coiled spring-steel shim. By selecting the dimensions and material characteristics of the spring element, the torsional stiffness can be so chosen that together with the mass of the brake disks 2 a spring/mass system of given harmonic frequency is achieved. This should match the frequency of torsional vibrations of the wheel set. In this way, when torsional vibrations of the wheel set occur, the brake disks are excited at their natural frequency and oscillate in anti-phase, thereby reducing or preventing further build up of the torsional vibrations.

FIG. 2 shows an alternative constructional arrangement of the vibration absorbing device whereby similar parts are indicated by the same reference numerals. This convention applies also to the embodiments described in FIGS. 3 to 11.

FIG. 2 illustrates brake disks 2, again arranged as a vibration absorbing device. The mass of the brake disks 2 is resiliently mounted by spring sleeves 4 to the flange 15 of the wheel 1. Within the flange 15 of the wheel the spring sleeve 4 is arranged at the circumference of a bore 21. Within the brake disks 2 the ends of the spring sleeve 4 extend into elliptical or oval counterbores 20' within the brake disks as can be seen in FIG. 2.1. From this figure it can also be seen that the spring sleeves are in contact with the radially outward surface of the bore in the brake disks 2. Under cooled conditions a small gap 24 remains between the radially inner surface of the elliptical counterbore 20 and the spring sleeve 4. The function and advantages of this elliptical counterbore embodiment will be discussed below.

According to FIG. 2.1, the spring sleeve 4 is provided with a longitudinal slot 25 used as a limit to the spring movement. When the brake disk moves with respect to the wheel 1, its path is substantially limited once the slot 25 closes. This serves to prevent excess movement of the disk e.g during heavy braking. Again, the precise stiffness of the spring sleeve 4 is defined by the wall thickness of the sleeve 4 and by its diameter.

In order to take account of thermal expansion of the brake disk 2 due to heat generation during braking, movement in the radial direction must be free. This is achieved by the elliptical or oval form of the counterbores 20' in the brake disk 2. The eccentricity "a" of these bores 20 allows for expansion of the brake disk up to a distance "a" without problems. The centering of the brake disk 2 with respect to the wheel 1 is achieved by the spring sleeves 4 being arranged concentrically around the flange 15 of the wheel 1. The gap "a" is consistently arranged towards the wheel hub 18.

According to the embodiment of FIG. 2, a compression sleeve 6 is arranged to improve the free motion of the brake disks 2 with respect to the wheel 1. The length of the compression sleeve 6 is suitably selected so that the greater part of the pre-stress of the bolt 5 passes through the contact surfaces of the brake disk 2 and wheel flange 15. The resulting force acting between the brake disk 2 and the wheel flange 15 is so chosen, that the freedom to vibrate of the vibration absorbing device i.e. the brake disk 2 is not impeded. This embodiment also has the advantage that transfer of heat from the brake disks 2 to the wheel flange 15 is improved. Despite the free connection of the brake disk 2 to the flange 15, the heat produced in the brake disk 2 during braking can be transmitted via the compression sleeve 6 to the flange 15. According to this arrangement the compression sleeve 6 together with the tension of the bolt 5 ensures that both brake disks oscillate in phase. Furthermore, during operation of the brakes the function of the vibration absorbing device is assured, since the brake force exerted by the brake shoes on the disk 2 is transmitted from one disk 2 to the other via the compression sleeve 6 whereby the brake disks 2 remain free to oscillate.

In an alternative to the arrangement of FIG. 2, the compression sleeve 6 may be arranged to abut against appropriately formed stepped surfaces (not shown) within the counter bores 20 of the brake disks 2 whereby the compression sleeve 6 may take substantially the full force of the pre load of the bolt 5 and any resulting force applied by the brakes shoes during braking.

According to the embodiment of FIG. 3, an alternative form of spring element is disclosed. The spring sleeve 4 comprises a combination of a cylindrical centering sleeve 4a and a generally rectangular spring plate 4b. The centering sleeve 4a serves to locate in the bore 21 through the flange 15. The spring plate 4b engages with a suitably shaped recess in the brake disk 2. Opposite, generally radially oriented edges of the spring plate 4b are upturned to provide a resilient bias against relative movement between the disk and flange in the tangential direction. Other shapes for the spring plate may also be envisaged including trapezoidal or arc shaped plates corresponding to the geometry of the brake disk.

The spring sleeve 4 may preferably be manufactured as a shrink fit component whereby the centering sleeve 4a is cooled before insertion into the hole in the pre-tempered spring plate 4b. On warming of the centering sleeve 4a, it expands to firmly attach the two elements together. Such a connection is preferred since any heating of the spring plate 4b e.g by welding could be detrimental to its spring characteristics.

A further alternative form of the spring element is disclosed in FIG. 4. This embodiment is substantially similar to the embodiment of FIG. 3 but is formed as a single piece by stamping, machine pressing or similar methods prior to the heat treatment required to achieve the desired spring characteristics.

Both FIGS. 3 and 4 show a single spring element mounted in the bore on one side of the flange. It is envisaged that the spring elements may be arranged in each of the bores alternately on the inside and outside surfaces of the wheel flange. It is however also possible that each bore is provided with two spring elements 4, each inserted from a respective side of the flange.

FIGS. 5 and 6 show an alternative embodiment of a vibration absorbing device for a wheel set of a rail vehicle. As in the embodiments of FIGS. 1 to 4 a rail wheel 1 includes a rim 7, a hub 18 and a flange 15 extending between the rim 7 and the hub 18. Brake disks 2 are mounted on the flange 15 of the wheel 1 according to standard practice. In the present embodiment, the brake disks 2 play no role in the absorbing of vibrations (although they are an integral part of the inertial mass of the wheel set) and could take any appropriate form or be omitted completely. This arrangement is particularly advantageous in those constructions where axle mounted braking means are employed.

An annular ring 33 is provided adjacent the inner surface of the rim 7. The annular ring 33 is preferably made of a metal of high specific mass such as iron or lead in order to maximise its inertial mass about the axle 17. Other sufficiently massive alternatives including composites and alloys may also be considered. The annular ring is provided on its circumferentially outer surface with a resilient rubber layer 32. The rubber layer 32 is in turn connected to the inner surface of the rim 7 such that the annular ring 33 may oscillate with respect to the rim 7. Various means of attaching the rubber layer to the rim 7 and to the annular ring 33 may be used including vulcanisation, adhesives, welding or mechanical fixation means such as bolts or clips, all of which should ensure that the connection between rim 7 and annular ring 33 is subjected to the resilience of the rubber layer 32. Other methods of providing resilient support to the annular ring 33 may also be envisaged, including spring steel clips or shims which facilitate vibration of the annular ring 33 in the circumferential direction with respect to the wheel 1. These could be combined with additional means such as the prepared surface 3 of FIGS. 1 to 4 above to ensure the requisite damping.

As in the above embodiments, the rubber layer 32 or other resilient means should be selected in conjunction with the inertial mass of the annular ring to match the harmonic frequency of torsional vibrations in the wheel set. The rubber layer 32 according to this embodiment provides the dual functions of spring and damper. Such arrangements have been shown to provide effective vibration absorption over a wide range of frequencies. According to the embodiment of FIG. 5, the annular ring 33 comprises a plurality of segments connected together by bolts 35. Such an arrangement provides for ease of mounting on existing wheel sets. Other connecting means such as pins or screws may be employed and the annular ring 33 may also be formed as a chain having one or more separable links.

It is also considered that the wheel itself may be provided with a resilient mounting such that all or part of the wheel may rotate with respect to the axle. An arrangement whereby the outer rim of the wheel is mounted by resilient means to the remainder of the wheel by suitably calibrated resilient means such as an annular rubber rim is considered. This arrangement would have the advantage that the wheel rim has both considerable mass and is located at the point of maximum amplitude of vibration of the wheel set.

FIG. 7 discloses such an arrangement of a wheel 1 having a flange 15. The rim 7 is provided with an interior surface 42 having a ridge shaped annular protrusion 45. This is received by a correspondingly shaped region formed by a supporting element 43 at the outer periphery of the flange 15 and a locking ring 44 secured by bolt 50, whereby a tongue and groove type connection is formed. Alternatively, the parts could be reversed with the groove being formed in the inner surface 42 of the rim and the ridge formed on the supporting element 43. In this embodiment the wheel rim 7 is arranged to be resiliently mounted with respect to the remainder of the wheel. To this effect, a rubber band or tyre 41 is provided between the inner surface 42 of the rim 7 and the supporting element 43. The tyre 41 is preferably attached to both the rim 7 and the supporting element 43 by adhesive, vulcanisation or the like. Alternatively, the joint may rely only on friction between the rubber and the adjacent surfaces to transfer forces from the wheel to the rim.

By careful selection of the mass of the resiliently mounted rim 7 with respect to the remainder of the wheel set and by an appropriate dimensioning of the rubber tyre 41, a vibration characteristic for the rim/tyre system can be achieved which provides the necessary vibration absorption required to reduce or eliminate torsional vibrations in the wheel set. As a result of this reduction in unwanted torsional vibrations, the wheel set may be provided with a drive system and drive control which is better adapted to reduce wheel slip by avoidance of those control parameters relating to torsional vibration which would otherwise have been needed.

While the above embodiment illustrates a rubber tyre 41 which provides resilience in both the radial and circumferential direction, it is to be noted that for the purpose of reducing torsional vibrations it is the circumferential resilience which is significant. According to the embodiment of FIG. 8 a similar arrangement is shown where the outer rim is mounted such that it is free to rotate with respect to the flange. The region of contact between the inner surface 42 of the outer rim and the supporting element 43 is provide with a prepared surface in a similar way to the prepared surface 3 of FIGS. 1 to 4. Spring elements acting circumferentially are arranged between the respective parts such that the rim 7 may oscillate with respect to the supporting element 43 with the requisite damping being provided by friction at the prepared surface. The advantage of such an arrangement over a rubber mounted rim is that it does not subject the wheel rim to additional bending stresses which may in the long term lead to fatigue and wheel damage. The arrangement also increases the overall resilience of the drive train, reducing abrupt shocks being transmitted from the wheel to the drive.

FIG. 9 shows an alternative arrangement of a resiliently mounted rim which does not require an additional locking ring. In this embodiment, relative movement takes place between the adjacent surfaces of the rim 7 and the supporting element 43 and also a washer 51 provided on the securing bolt 50. Any or all of these surfaces may be suitably provided with friction determining or reducing means. In order to allow the rim 7 to rotate with respect to the remainder of the wheel, it is provided with elongate or oval bores 52 oriented in the circumferential direction, through which the securing bolts 50 insert.

FIG. 10 shows an example of a spring element 53 arranged between the rim 7 and the supporting element 43. It comprises an oval sleeve of spring steel which is inserted into a correspondingly shaped oval recess 54 formed partially in the rim 7 and partially in the supporting element 43. The recess 54 is accessible and visible from the exterior surface of the wheel and a number of spring elements 53 and recesses 54 may be arranged around the circumference. Alternatively, such spring elements may be arranged between the ridge and groove elements of FIG. 8, locked in place by the presence of the locking ring 44.

FIG. 11 shows an alternative arrangement using a helical spring 55 received in a correspondingly shaped cylindrical recess 54 formed between the rim 7 and the supporting element 43. Other forms of spring elements such as the split spring or the spring plates of FIGS. 2 to 4 or any other appropriate resilient means such as rubber or elastomeric blocks may equally be used to provide the necessary resilience.

Although the present invention has been described in relation to wheel mounted vibration absorbing devices, it is noted that such arrangements may equally be mounted upon the axle itself. FIG. 12 shows a schematic arrangement of a rail vehicle 60 including a wheel set formed by a pair of wheels 1 and an axle 17. Axle mounted brake disks 62 are resiliently mounted to the axle 17 adjacent each wheel by an appropriate spring damper system as described above, such that all or part of the mass of the brake disk functions to absorb torsional vibrations in the axle 17. A drive 64 is engaged at a mid-point of the axle 17 to cause rotation thereof. The drive is controlled by a control system 66.

The invention claimed is:

1. A wheel set for a rail vehicle comprising a pair of wheels connected by an axle and a vibration absorbing device comprising a mass resiliently mounted for circumferential oscillatory movement with respect to the wheel set and a spring element acting circumferentially between the mass and the wheel set, such that the mass can oscillate at the resonant frequency of torsional vibrations of the wheel/axle system and wherein damping of the oscillatory movement is provided by a friction determining surface between mutually contacting surfaces of the wheel set and the mass.

2. The wheel set according to claim 1, wherein the vibration absorbing device is mounted on the wheel.

3. The wheel set according to claim 1, wherein the mass of the vibration absorbing device comprises at least a segment of an annular ring concentrically mounted with respect to the axle.

4. The wheel set according to claim 3, wherein the segment is mounted to the wheel by a spring element.

5. The wheel set according to claim 4, wherein the wheel is provided with a bore and the spring element comprises a cementing sleeve for insertion in the bore and a spring plate for engaging with the segment.

6. The wheel set according to claim 4, wherein the wheel is provided with a bore and the segment is provided with a counter bore and the spring element comprises a spring sleeve which inserts into both the bore and the counter bore.

7. The wheel set according to claim 5, wherein the spring sleeve includes a longitudinal slot, the width of which determines the maximum amplitude of oscillation of the segment with respect to the wheel.

8. The wheel set according to claim 3, wherein the wheel comprises a flange and a pair of segments are mounted on opposite facing sides of the wheel and connected together through the flange to oscillate together.

9. The wheel set according to claim 8, wherein the wheel is provided with a bore through the flange and the spring sleeve passes through the bore and inserts into counter bores formed in both segments.

10. The wheel set according to claim 9, wherein the segments are connected together by a fastening element passing through the spring sleeve.

11. The wheel set according to claim 10, wherein the fastening element comprises a compression sleeve and a tensioning bolt, the compression sleeve being of a length to support between the segments through the flange whereby on tensioning, a pre-stress of the bolt may be taken by the compression sleeve to reduce a contact force between the segments and the flange.

12. The wheel set according to claim 3, in which the segment comprises a brake disk.

13. The wheel set according to claim 6, in which the segment comprises a brake disk and at least one of either the bore or the counter bore is elliptical or oval and radially oriented to allow for thermal expansion of the brake disk.

14. The wheel set according to claim 3, wherein the mass is mounted to the wheel adjacent to its outer circumference.

15. The wheel set according to claim 1, wherein the vibration absorbing device comprises part of the wheel.

16. The wheel set according to claim 15, wherein the mass of the vibration absorbing device is provided by a rim of the wheel which is resiliently mounted with respect to a remainder of the wheel.

17. The wheel set according to claim 1, wherein the vibration absorbing device is mounted on the axle adjacent to the wheel.

18. The wheel set according to claim 1, wherein a vibration absorbing device is mounted on or adjacent to both wheels.

19. The wheel set according to claim 1, further comprising a drive engaged to cause rotation of the axle.

20. The wheel set according to claim 19, wherein the drive engages the axle at or adjacent to a mid point thereof.

21. The wheel set according to claim 19, further comprising a control system, the control system being adapted in use to register and control slip between the wheels and the rail.

22. A method of preventing or reducing torsional vibrations in a wheel set of a rail vehicle comprising a pair of wheels connected by an axle, the method comprising determining the resonant frequency of torsional vibrations of the wheel/axle system and resiliently mounting a mass on the wheel set using a spring element acting circumferentially between the wheel set and the mass and a friction determining surface between mutually contacting surfaces of the wheel set and the mass, the mass and its resilient mounting being selected to oscillate at or near that resonant frequency.

23. A vibration absorbing device for reducing torsional vibrations in a rail vehicle wheel set comprising a pair of wheels connected by an axle, the vibration absorbing device comprising:
   a mass mounted for circumferential oscillatory movement with respect to the wheel set;
   a spring element acting circumferentially between the mass and the wheel set;
   and a friction determining surface between mutually contacting surfaces of the wheel set and the mass for damping of the oscillatory movement such that the mass can oscillate at a resonant frequency of torsional vibrations of the wheel/axle system.

* * * * *

UNITED STATES PATENT AND TRADEMARK OFFICE
CERTIFICATE OF CORRECTION

PATENT NO.       : 7,625,030 B2
APPLICATION NO.  : 10/521361
DATED            : December 1, 2009
INVENTOR(S)      : Bieker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 818 days.

Signed and Sealed this

Twenty-sixth Day of October, 2010

David J. Kappos
*Director of the United States Patent and Trademark Office*